(12) United States Patent
Deeds

(10) Patent No.: US 6,202,257 B1
(45) Date of Patent: Mar. 20, 2001

(54) HANDHELD DEVICE HAVING MODIFIABLE HANDGRIP CONFIGURATION

(75) Inventor: Douglas Deeds, Fort Worth, TX (US)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/340,886

(22) Filed: Jun. 28, 1999

(51) Int. Cl.[7] .................................................. A47B 95/02
(52) U.S. Cl. .............................. 16/430; 16/422; 294/1.1; 294/137
(58) Field of Search ................................ 294/1.1, 15, 25, 294/27.1, 137; 16/421, 425, 430, DIG. 12, DIG. 24, 422, 423; 379/433, 440

(56) References Cited

U.S. PATENT DOCUMENTS

| | | | |
|---|---|---|---|
| 727,368 | * | 5/1903 | Howard .................................. 294/1.1 |
| 2,782,063 | * | 2/1957 | Ziegfeld .................................. 294/15 |
| 3,207,547 | * | 9/1965 | Trotter et al. ........................ 294/1.1 |
| 3,341,887 | * | 9/1967 | Tolmie .................................... 16/430 |
| 4,020,527 | * | 5/1977 | O'Neill .................................. 294/25 |
| 4,121,744 | * | 10/1978 | Minear .................................. 294/1.1 |
| 4,226,349 | * | 10/1980 | Uccellini ............................... 294/15 |
| 4,850,502 | * | 7/1989 | Davis ..................................... 16/425 |
| 5,365,631 | * | 11/1994 | Emerick ................................. 294/2 |
| 5,390,972 | * | 2/1995 | Galloway .............................. 294/15 |
| 5,640,741 | * | 6/1997 | Yano ...................................... 16/421 |
| 5,822,830 | * | 10/1998 | Lin ......................................... 16/422 |

* cited by examiner

Primary Examiner—Dean J. Kramer
(74) Attorney, Agent, or Firm—Brian T. Rivers; Jubin Dana

(57) ABSTRACT

A handheld device that has a modifiable handgrip configuration. The modifiable handgrip configuration allows the form of the handheld device to be changed depending on a user's preference. A user may change the handgrip configuration of the device to a form optimized for gripping by a particular manner according to needs. In an embodiment, the handheld device comprises substantially parallel sides configured to allow attachment and removal of alternative handgrips.

5 Claims, 4 Drawing Sheets

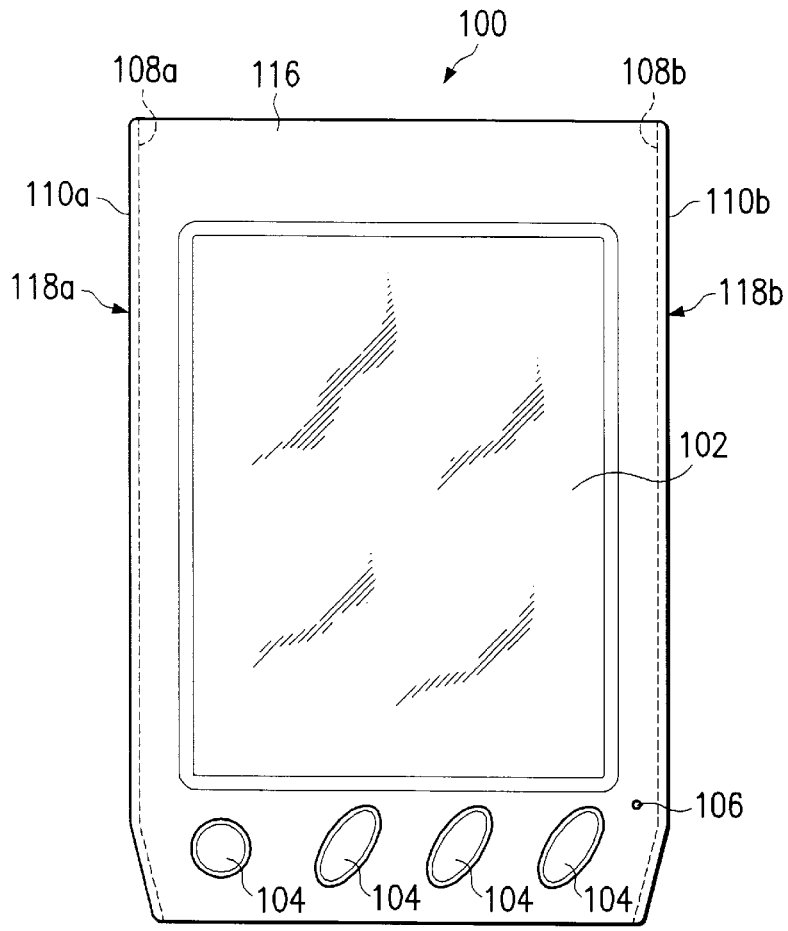
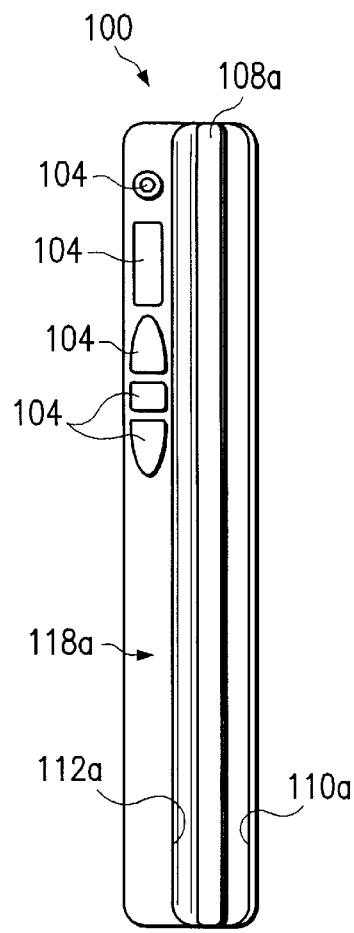
*FIG. 1A*
*FIG. 1B*
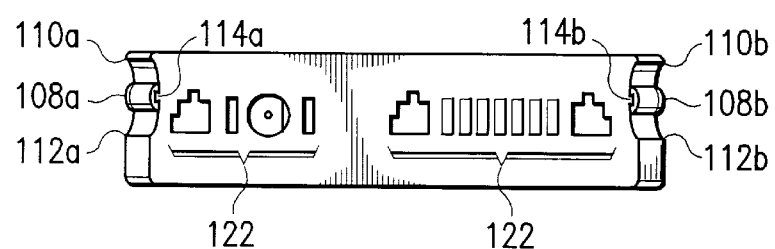
*FIG. 1C*

HANDHELD DEVICE HAVING MODIFIABLE HANDGRIP CONFIGURATION

FIELD OF THE INVENTION

This invention relates to handheld devices and, more particularly, to a handheld device having a modifiable handgrip configuration.

BACKGROUND OF THE INVENTION

Handheld devices, such as remote controllers, personal digital assistants (PDAs) and cellular phones, have become increasingly popular as technology has advanced. Most of these handheld devices can be held and operated in one hand, or held in one hand and operated with the other hand.

Many users of handheld devices prefer to grip the device by its sides using their fingers or to cradle the device in the palm of their hand. Most handheld devices are designed and formed best for use while either gripped by the sides or cradled in the palm of the hand, but are not formed best for use both ways. For example, PDAs, which are generally rectangular with concave sides, may be gripped easily by the sides. However, a PDA having convex sides may be better fitted to the palm of the hand for a user preferring to operate the device cradled in the palm of the hand. The same situation may apply to other handheld devices, in that the handheld device may be better configured for a handheld use not preferable to the user of the device.

SUMMARY OF THE INVENTION

The present invention provides a handheld device that has a modifiable handgrip configuration. The modifiable handgrip configuration allows the form of the handheld device to be changed depending on the needs and preferences of a user of the device. For example, a user who prefers to grip the device by the edges may change the handgrip configuration of the device to a form optimized for gripping at the edges, while a user who prefers to cradle the device in the palm of the hand may change the handgrip configuration to a form optimized for cradling in the palm of the hand.

In an embodiment of the invention, a generally rectangular device is provided with an edge configured to allow removal and replacement of handgrips at the sides of the device. Each handgrip of the device may be removed and replaced by sliding the handgrip out of and into grooves formed on the sides of the device with a rib formed on the handgrip to engage the grooves. Alternatively, other methods could be used to allow removal and replacement of the handgrips. For example, the rib could be formed on the side of the device, and a groove on the handgrip could engage the rib for removal and replacement of the handgrip by sliding, or snap fasteners could be used to secure the handgrip on each side of the device.

In the embodiment, the handgrip may be formed with a convex or concave form. When a user desires to grip the device by the sides, handgrips having concave form may be used. When a user desires to cradle the device in palm of the hand, handgrips having convex form may be used.

BRIEF DESCRIPTION OF THE DRAWINGS

FIGS. 1A, 1B and 1C illustrate front, left side and bottom views, respectively, of a handheld device according to an embodiment of the invention;

DETAILED DESCRIPTION OF THE INVENTION

Figure 2A:
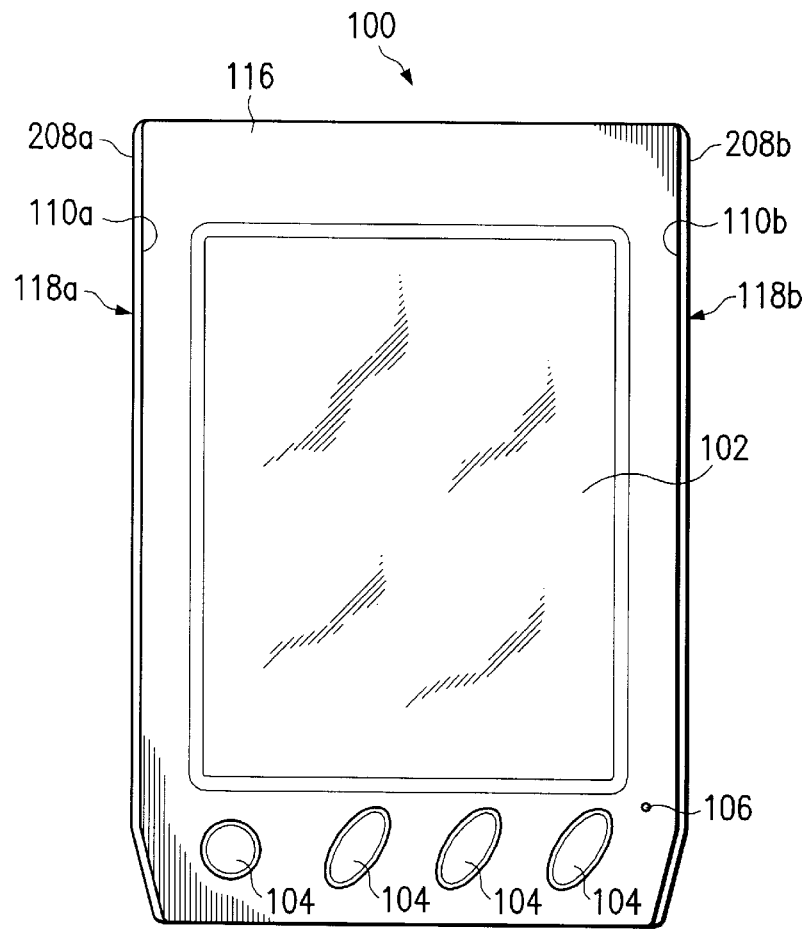
FIGS. 2A, 2B and 2C illustrate front, left side and bottom views, respectively, of an alternative grip configuration of a handheld device according to an embodiment of the invention.

Referring now to FIGS. 1A, 1B and 1C, therein are illustrated front, left side and bottom views, respectively, of a handheld device according to an embodiment of the invention. In the embodiment of the invention, handheld device 100 may be a personal digital assistant (PDA) or handheld personal computer (PC). Handheld device 100 comprises a body 116 having sides 118a and 118b. Handheld device 100 includes control keys 104 and microphone 106 for controlling operation. Handheld device 100 may include electrical connection parts 122 for interfacing the device with other electronic devices. Side 118a includes raised portions 110a and 112a, and side 118b includes raised portions 110b and 112b. In the embodiment, each of the raised portions 110a and 112a (110b and 112b) runs the length of side 118a (118b) and provides a gripping portion on side 118a (118b). Side 118a (118b) also includes a rib 114a (114b) that runs along side 118a (118b).

According to the embodiment of the invention, handgrips 108a and 108b may be attached or secured on sides 118a and 118b to form a gripping surface with said gripping portions of each of 118a and 118b. In FIGS. 1A, 1B and 1C, handgrips 108a and 108b are configured to removably fit within raised portions 110a and 112a and within raised portions 110b and 112b to form a concave gripping surface on the gripping portion of sides 118a and 118b. In the embodiment, handgrips 108a and 108b may be of any material that flexibly conforms to the contour of body 116. Ribs 114a and 114b, as shown in FIG. 1C, run along sides 118a and 118b and receive a groove that is formed in the inside surface of handgrips 108a and 108b.

Figure 3A:
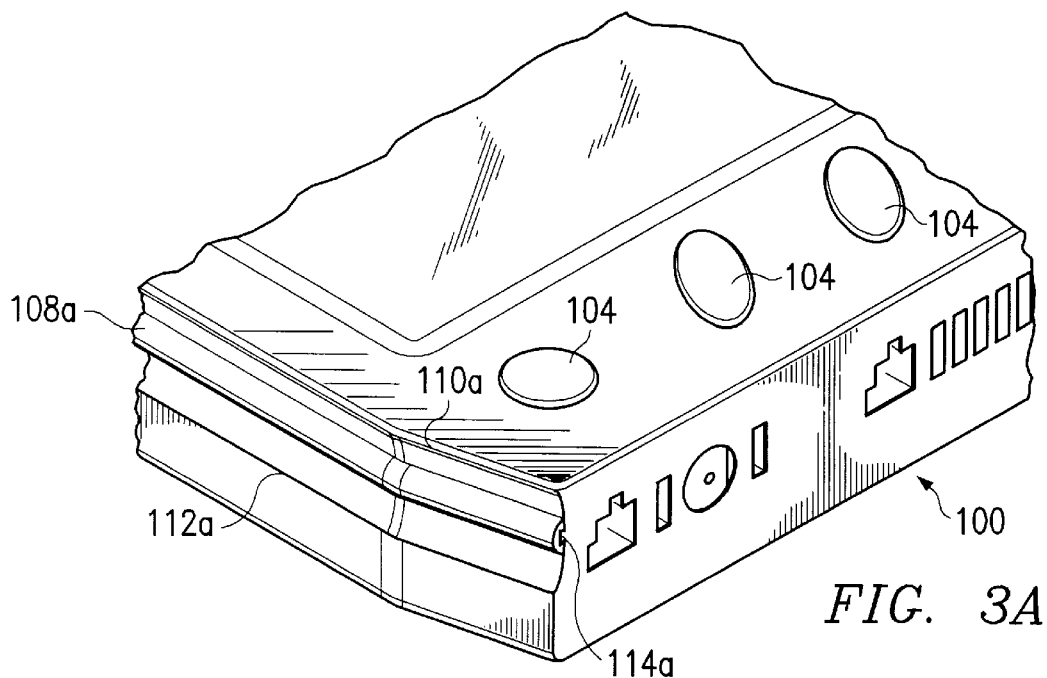
FIGS. 3A and 3B illustrate corner views of a handheld device according to an embodiment of the invention.
Figure 4A:
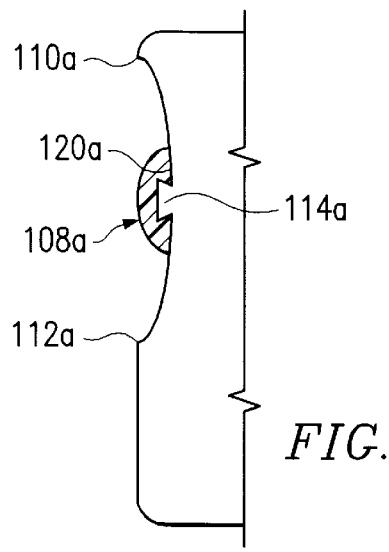
FIGS. 4A and 4B illustrate bottom views of the left side of the representation of the handheld device shown in FIGS. 1C and 2C, respectively.

Referring now to FIG. 4A, therein is illustrated a bottom view of a left side section of handheld device 100. FIG. 4A illustrates a detailed view of the left side of the representation of device 100 as shown in FIG. 1C. Rib 114a, formed on body 116, is shown engaging a groove formed on inside surface 120 of handgrip 108a. Another view of handheld device 100 is shown in FIG. 3A. FIG. 3A illustrates a corner view of a portion of handheld device 100 with a concave gripping area according to an embodiment of the invention. FIG. 3A shows the generally concave gripping area formed by handgrip 108a and raised portions 110a and 112a.

Figure 2B:
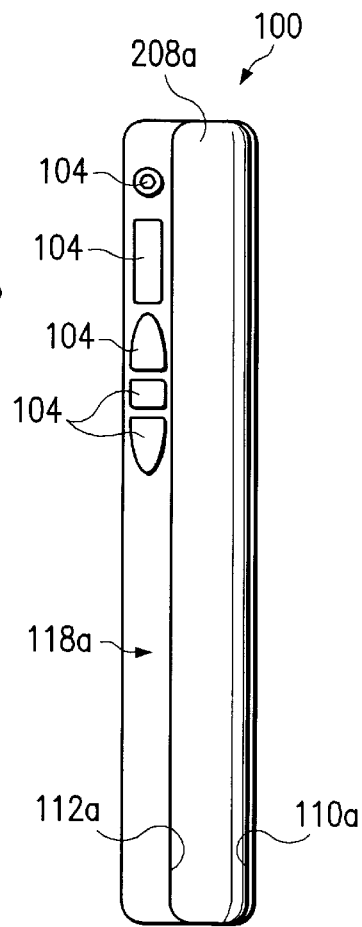
Figure 2C:
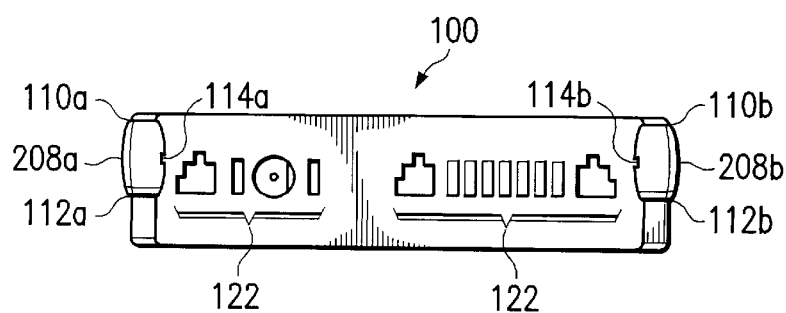

Referring now to FIGS. 2A, 2B and 2C, therein are illustrated front, left side and bottom views, respectively, of the handheld device of FIG. 1 with a modified handgrip configuration. In FIGS. 2A–2C, handheld device 100 has been configured so that handgrips 208a and 208b have replaced the handgrips 108a and 108b shown in FIGS. 1A–1C. Handgrips 208a and 208b are configured to removably fit within raised portions 110a and 112a and 110i b 1 and 112b to form a convex gripping surface on the gripping portion of sides 118a and 118b.

Figure 3B:
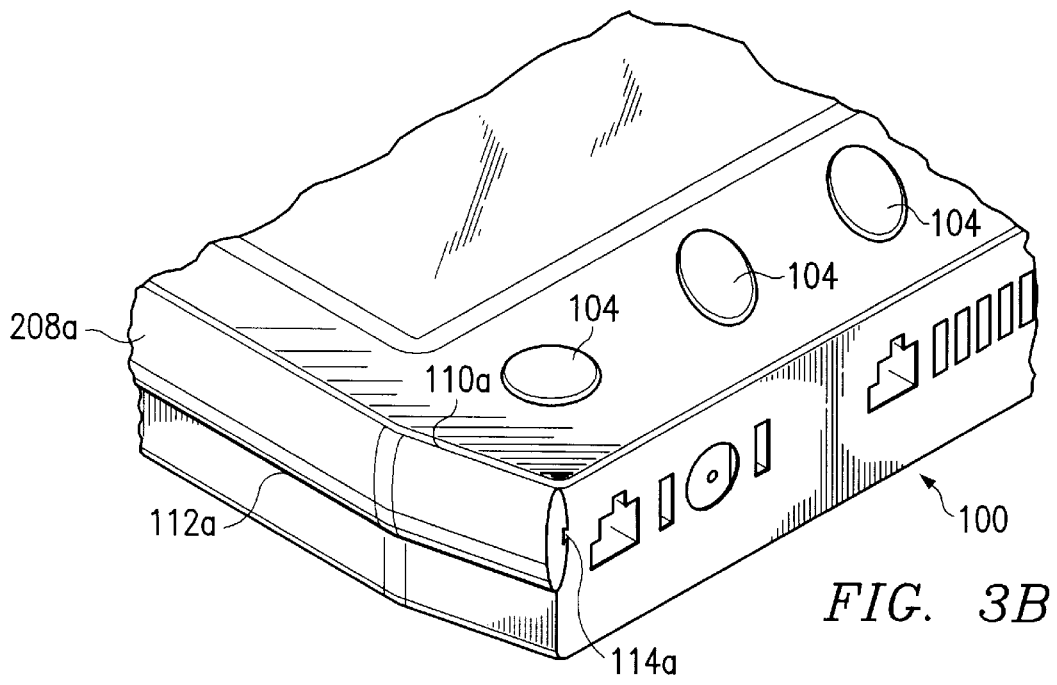
Figure 4B:
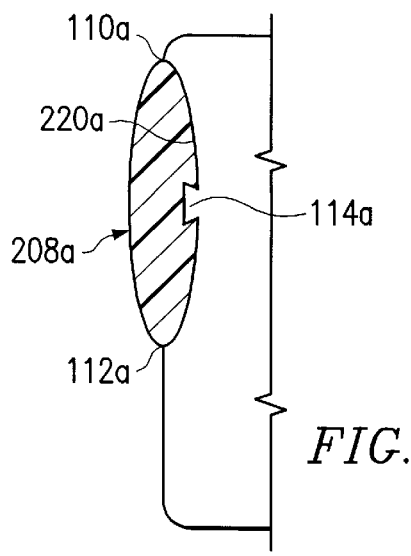

Referring now to FIG. 4B, therein is illustrated a bottom view of a left side section of handheld device 100. FIG. 4B illustrates a detailed view of the left side of the representation of the device 100 as shown in FIG. 2C. Handgrip 208a has a groove formed on inside surface 220a that allows attachment to rib 114a. Another view of handheld device 100 is shown in FIG. 3B. FIG. 3B illustrates a corner view of a right side portion of handheld device 100 with a convex gripping area according to an embodiment of the invention. FIG. 3B shows the generally convex gripping area formed by handgrip 208a and raised portions 110a and 112a.

Figure 5A:
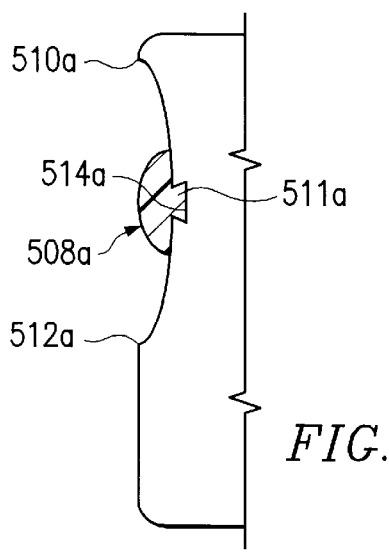
FIGS. 5A and 5B illustrate bottom views of an alternative attachment method according to an embodiment of the invention.
Figure 5B:
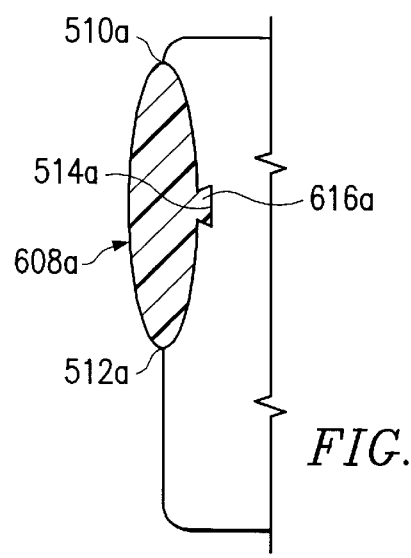

While handgrips 108a, 108b, 208a and 208b are shown running the length of body 116 in FIGS. . 1A–1C and FIGS. 2A–2C, in alternative variations of the embodiment handgrips 108a, 108b, 208a and 208b may be of any length that forms an acceptable gripping surface on body 116, when the handgrips are attached to body 116. In these embodiments, the handgrips may be formed of any suitable material of any resilience. Alternative embodiments may also provide a single modifiable handgrip or more than two modifiable handgrips. In another alternative, the device body may be configured so that grooves on the sides of the body, such as shown by groove 514a in FIGS. 5A and 5B, are formed to receive a rib 516a, 616a that is formed on the handgrip 508a or 608a, rather than the grooves being formed on the handgrips. Whether formed on the handgrips or on the device body in various alternatives, the grooves may be closed or open ended, or open at one side so that the handgrips may be slid or pressed removably onto the device body.

In alternative embodiments of the invention, the handgrips may be of any other shape or form that provides a desired gripping surface for a user of the handheld device. For example, a handgrip may include indentations that form gripping surfaces with finger positions on the edges of a handheld device, or provide rings to position the user's fingers at certain locations on the handheld device.

Figure 6A:
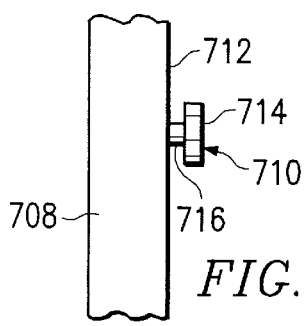
FIGS. 6A, 6B and 6C illustrate another alternative attachment method according to an embodiment of the invention.
Figure 6B:
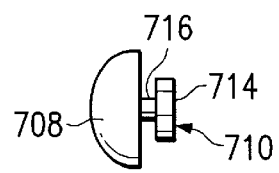
Figure 6C:
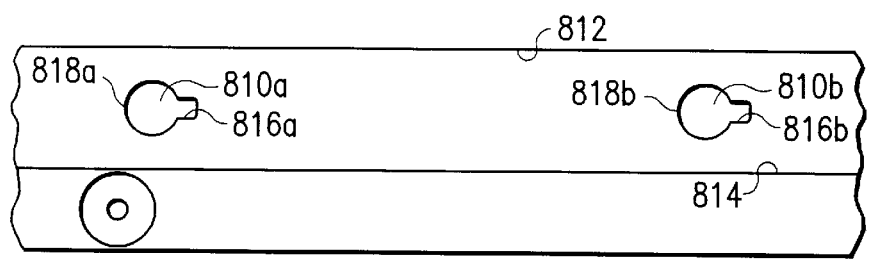

Also, in alternative embodiments, the handgrips may be attached to the sides of the handheld device by any method that provides acceptable attachment and allows removal of the handgrips. For example, a peg and slot arrangement could be utilized. Referring now to FIGS. 6A–6C, therein is illustrated an alternative attachment method for handgrips according to an embodiment of the invention. FIG. 6A shows a portion of handgrip 708 having at least one peg, such as peg 710, formed on inside surface 712 of handgrip 708. FIG. 6B shows a bottom view of handgrip 708. Peg 710 has a narrow portion 716 and a head portion 714. There may be a plurality of pegs, such as peg 710, formed on inside surface 712. FIG. 6C shows a side view of a portion of a handheld device. Raised portions 812 and 814 of the handheld device of FIG. 6C correspond to raised portions 110a and 112a of handheld device 100 of FIGS. 1A–1C. A plurality of keyholes, such as keyholes 810a and 810b, each has a broad portion, 818a and 818b, and a narrow portion, 816a and 816b, respectively. The head portion of each peg, such as head portion 714 of peg 710, on a handgrip, such as handgrip 708, is inserted into one of the keyholes on the handheld device and slid in the direction of the narrow portion, locking and attaching the handgrip to the handheld device by locking head 714 in narrow portion 816a or 816b.

Although described above with respect to particular embodiments of handheld devices, it is the scope of this invention to include any handheld device, such as a mobile phone, cellular communicator, two-way radio, remote controller or pager, that provides edges acceptable for attaching handgrips.

Thus, while the invention has been particularly shown and described with respect to a preferred embodiment thereof, it will be understood by those skilled in the art that changes in form and details may be made therein without departing from the scope and spirit of the invention.

What is claimed is:

1. A handheld device comprising:
   at least one handgrip, wherein said handgrip is made of a resilient material;
   a body having at least one side, wherein each of said at least one side is configured to allow slidable attachment of said at least one handgrip on said at least one side, and to allow slidable removal of said at least one handgrip from said at least one side, wherein said at least one side comprises:
   a first side; and
   a second side disposed on opposite ends of said body and
   wherein said at least one handgrip comprises a plurality of handgrips and
   wherein each of said first and second sides is configured to allow attachment of a first and second handgrip of said plurality of handgrips on each of said first and second sides, respectively and each of said first and second sides is configured to allow removal of said first and second handgrip from each of said first and second sides, respectively and
   wherein said body is substantially rectangular and
   wherein said first and second sides of are substantially parallel to one another on opposite sides of said body and
   wherein said plurality of handgrips comprises a selected handgrip that forms a concave surface on said handheld device, when said selected handgrip is attached to at least one of said first and second side.

2. A handheld device comprising:
   at least one handgrip, wherein said handgrip is made of a resilient material;
   a body having at least one side, wherein each of said at least one side is configured to allow slidable attachment of said at least one handgrip on said at least one side, and to allow slidable removal of said at least one handgrip from said at least one side wherein said at least one side comprises:
   a first side; and
   a second side disposed on opposite ends of said body and
   wherein said at least one handgrip comprises a plurality of handgrips and
   wherein each of said first and second sides is configured to allow attachment of a first and second handgrip of said plurality of handgrips on each of said first and second sides; respectively and each of said first and second sides is configured to allow removal of said first and second handgrip from each of said first and second sides, respectively and
   wherein said body is substantially rectangular and
   wherein said first and second sides of are substantially parallel to one another on opposite sides of said body and
   wherein said plurality of handgrips comprises a selected handgrip that forms a convex surface on said handheld device, when said selected handgrip is attached to at least one of said first and second side.

3. A handheld device comprising:
   a plurality of handgrips, a body having a first and a second side, wherein said first and second sides are disposed opposite one another on said body, and wherein said first and second sides, respectively provide first and second gripping portions on the handheld device; and first and second securing structures slidably and removably disposed, respectively, on said first and second gripping portions, said first and second securing structures for securing one of said plurality of handgrips on said first and second sides, respectively, wherein the handgrips run the length of said first and second sides, wherein said first and second securing structures comprise a first and second groove formed, respectively, in said first and second gripping portions, and wherein each of said plurality of handgrips has a surface and a rib formed on said surface, wherein said first and second grooves are formed to receive said ribs.

4. A handheld device comprising:

a pluralilty of handgrips;

a body having a first and a second side, wherein said first and second sides are disposed opposite one another on said body, and wherein said first and second sides, respectively, provide first and second gripping portions on the handheld device; and first and second securing structures slidably and removably disposed, respectively, on said first and second gripping portions, said first and second securing structures for securing one of said plurality of handgrips on said first and second sides respectively, wherein the handgrips run the length of said first and second sides, wherein said first and second securing structures comprise first and second ribs formed, respectively, on said first and second gripping portions, and wherein each of said plurality of handgrips has a surface and a groove formed on said surface, wherein said first and second ribs are formed to receive said groove.

5. A handheld device comprising:

a plurality of handgrips;

a body having a first and a second side, wherein said first and second sides are disposed opposite one another on said body, and wherein said first and second sides, respectively, provide first and second gripping portions on the handheld device; and first and second securing structures slidably and removably disposed, respectively, on said first and second gripping portions, said first and second securing structures for securing one of said plurality of handgrips on said first and second sides, respectively, wherein the handgrips run the length of said first and second sides, wherein the surface of each of said handgrips comprises a first surface, and each of said handgrips further has a second surface, said second surface of a first and second handgrip of said plurality of handgrips, forming a concave surface with said fist and second gripping portions when secured on said first and second sides, respectively.

* * * * *